United States Patent
Chan et al.

(10) Patent No.: US 9,442,581 B2
(45) Date of Patent: Sep. 13, 2016

(54) TOUCH PEN FOR A CAPACITIVE TOUCH PAD

(71) Applicant: Primax Electronics Ltd., Neihu, Taipei (TW)

(72) Inventors: Chin-Ping Chan, Taipei (TW); Cheng-Chi Hsu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 50 days.

(21) Appl. No.: 14/558,336

(22) Filed: Dec. 2, 2014

(65) Prior Publication Data

US 2016/0109965 A1    Apr. 21, 2016

(30) Foreign Application Priority Data

Oct. 17, 2014  (TW) ................................ 10313598 A

(51) Int. Cl.
  *G06F 3/0354* (2013.01)
  *G06F 3/041* (2006.01)
  *G06F 3/044* (2006.01)

(52) U.S. Cl.
  CPC ......... *G06F 3/03545* (2013.01); *G06F 3/0416* (2013.01); *G06F 3/044* (2013.01)

(58) Field of Classification Search
  CPC .......................... G06F 3/03545; G06F 3/044
  See application file for complete search history.

(56) References Cited

U.S. PATENT DOCUMENTS

| | | | | |
|---|---|---|---|---|
| 9,239,639 | B1* | 1/2016 | Vanderet | G06F 3/03545 |
| 2001/0028345 | A1* | 10/2001 | Natsuyama | G06F 3/03545 345/179 |
| 2010/0302213 | A1* | 12/2010 | Yeh | G06F 1/1626 345/179 |
| 2014/0306940 | A1* | 10/2014 | Fukushima | G06F 1/1626 345/179 |
| 2015/0015549 | A1* | 1/2015 | Lu | G06F 3/03545 345/179 |
| 2016/0018912 | A1* | 1/2016 | Kaneda | G06F 3/033 345/179 |

* cited by examiner

*Primary Examiner* — Quan-Zhen Wang
*Assistant Examiner* — Xuemei Zheng
(74) *Attorney, Agent, or Firm* — Kirton McConkie; Evan R. Witt

(57) ABSTRACT

A touch pen includes a sleeve, a contact element, a sensing device and a buffering element. The contact element is penetrated through the sleeve and movably relative to the sleeve. The sensing device is disposed within the sleeve. The buffering element is disposed within the sleeve. The contact element and the sensing device are separated from each other by the buffering element. While the contact element is moved in response to an external force applied to touch pen, the impact of the contact element on the sensing device is largely reduced because the contact element and the sensing device are separated from each other by the buffering element. Moreover, since the external force is received by the buffering element, the sensing device can be protected by the buffering element. Consequently, the failure probability of the touch pen is reduced.

7 Claims, 6 Drawing Sheets

TOUCH PEN FOR A CAPACITIVE TOUCH PAD

FIELD OF THE INVENTION

The present invention relates to a touch pen, and more particularly to a touch pen for a capacitive touch pad.

BACKGROUND OF THE INVENTION

The widely-used peripheral input device of a computer system comprises for example a mouse device, a keyboard device, a trackball device, or the like. With the progress of the times, a touch pad has been introduced into the market. By directly using the user's fingers or using a touch pen to operate the touch input device, the computer system or other appropriate electronic device can be correspondingly controlled.

Nowadays, the commercially available touch pads are classified into several types, including a resistive touch pad, an acoustic wave touch pad, an infrared touch pad and a capacitive touch pad. The operating principles of these touch pads will be shortly illustrated. When a pressing object (e.g. the user's finger) is placed on the resistive touch pad, a voltage is generated and the pressing position is recognized according to the voltage. Moreover, acoustic waves pass over the surface of the acoustic wave touch pad. By touching the surface of the acoustic wave touch pad, the travelling path of the acoustic wave is blocked by the pressing object and thus the position of the pressing point is recognized. Similarly, infrared rays pass over the surface of the infrared touch pad. By touching the surface of the infrared touch pad, the travelling path of the infrared rays is blocked by the pressing object and thus the position of the pressing point is recognized. When the user's finger is contacted with the capacitive touch pad, the capacitance value of the touch point of the capacitive touch pad is subjected to a change. According to the change of the capacitance value, the position of the touch point is recognized. In views of the touch accuracy and the fabricating cost, the capacitive touch pad is widely adopted by most users.

With increasing development of the capacitive touch pad, a capacitive touch pen for the capacitive touch pad has been introduced into the market. FIG. 1 is a schematic cross-sectional view of a conventional capacitive touch pen. As shown in FIG. 1, the conventional capacitive touch pen 1 comprises a conductive pen tip 11, a metallic main body 12, a pressure sensor 13, a spiral spring 14, a circuit board 15, an actuating button 16, two triggering switches 17 and a battery 18. The conductive pen tip 11 is located at an end of the metallic main body 12 and partially exposed outside the metallic main body 12. A first end 111 of the conductive pen tip 11 may be contacted with a capacitive touch pad (not shown). A second end 112 of the conductive pen tip 11 may be contacted with the pressure sensor 13. The spiral spring 14 is sheathed around the second end 112 of the conductive pen tip 11 and contacted with the pressure sensor 13. In case that the pressure sensor 13 is pushed by the second end 112 of the conductive pen tip 11, the pressure sensor 13 generates a touch signal. The circuit board 15 is disposed within the metallic main body 12. The pressure sensor 13 and the two triggering switches 17 are connected with the circuit board 15. The actuating button 16 is disposed on the metallic main body 12 and partially exposed outside the metallic main body 12. The actuating button 16 is contacted with the actuating button 16. The battery 18 is electrically connected with the two triggering switches 17 for providing electric power to the circuit board 15.

When the actuating button 16 is pressed by the user, the two triggering switches 17 are pushed by the actuating button 16. Consequently, the two triggering switches 17 generate an signal to the circuit board 15 in order to activate the capacitive touch pen 1. After the capacitive touch pen 1 is activated, the user may grasp the capacitive touch pen 1 and allow the first end 111 of the conductive pen tip 11 to be contacted with the capacitive touch pad. Consequently, the conductive pen tip 11 is moved relative to the metallic main body 12 in the direction toward the pressure sensor 13, and the spiral spring 14 is compressed to accumulate an elastic force. On the other hand, the pressure sensor 13 is pushed by the second end 112 of the conductive pen tip 11. Consequently, the pressure sensor 13 generates the touch signal and transmits the touch signal to the conductive pen tip 11. Under this circumstance, the capacitance value of the touch point between the capacitive touch pad and the conductive pen tip 11 is changed. According to the change of the capacitance value, the capacitive touch pad may recognize the position of the touch point and generate a corresponding command.

When the capacitive touch pen 1 is moved away the capacitive touch pad, the first end 111 of the conductive pen tip 11 is no longer contacted with the capacitive touch pad. Under this circumstance, the compressed spiral spring 14 releases the elastic force so as to push the conductive pen tip 11. Consequently, the conductive pen tip 11 is moved relative to the metallic main body 12 in the direction away from the pressure sensor 13, and the conductive pen tip 11 is returned to the original position before being pushed.

However, the conventional capacitive touch pen 1 still has the following two drawbacks. Firstly, due to the structure of the conventional capacitive touch pen 1, the pressure sensor 13 is readily suffered from failure. For example, if the conventional capacitive touch pen 1 falls down to a table surface or a floor because of the user's carelessness, the first end 111 of the conductive pen tip 11 is strongly collided by the table surface or the floor, and the pressure sensor 13 is strongly collided by the second end 112 of the conductive pen tip 11.

Secondly, the pressure sensor 13 can detect the pressing force applied by the user and generate different touch signals according to different intensities of the pressing force. According to different touch signals, the conventional capacitive touch pen 1 can generate different effects. For example, if a normal pressing force is applied by the user, a line with a normal thickness may be drawn by the conventional capacitive touch pen 1. Whereas, if a stronger pressing force is applied by the user, a thicker line may be drawn by the conventional capacitive touch pen 1. However, the intensities of the pressing force received by the pressure sensor 13 and the intensities of the generated touch signals are not in a linear relationship.

For example, if a normal pressing force (e.g. 100 g) is applied by the user, a line with a normal thickness may be drawn by the conventional capacitive touch pen 1. However, if a pressure force of 200 g is applied by the user, a line with the normal thickness is also drawn by the conventional capacitive touch pen 1. Until a pressure force of 400 g is applied by the user, a thicker line may be drawn by the conventional capacitive touch pen 1. As mentioned above, if the difference between the intensities of the pressing force applied by the user is not very large, the lines drawn by the conventional capacitive touch pen 1 have the same thickness because the intensities of the touch signals outputted from the pressure sensor 13 are non-linear. Since the lines with the same thickness may be drawn in response to different intensities of the pressing force, the use of the conventional capacitive touch pen 1 perplexes the user.

Therefore, there is a need of providing an improved touch pen for reducing the failure probability and avoiding perplexing the user.

SUMMARY OF THE INVENTION

An object of the present invention provides a touch pen for reducing the failure probability and avoiding perplexing the user.

In accordance with an aspect of the present invention, there is provided a touch pen for a capacitive touch pad. The touch pen includes a main body, a contact element, a sleeve, a sensing device and a buffering element. The contact element is disposed on the main body and partially protruded out of the main body. When the contact element is contacted with the capacitive touch pad, a touch signal is transmitted to the capacitive touch pad through the contact element. The sleeve is disposed within the main body. The contact element is penetrated through the sleeve and movably fixed on the sleeve. The sensing device is disposed within the sleeve. In response to a movement of the contact element, the sensing device is triggered to generate the touch signal. The buffering element is disposed within the sleeve and contacted with the contact element and the sensing device. The contact element and the sensing device are separated from each other by the buffering element, and the touch signal is transmitted to the contact element through the buffering element.

From the above descriptions, the present invention provides the touch pen. The buffering element is arranged between the contact element and the sensing device. The contact element and the sensing device are separated from each other by the buffering element. If the external force applied to the touch pen is very large and the contact element is moved relative to the sleeve in the direction toward the sensing device, the impact of the contact element on the sensing device is largely reduced because the contact element and the sensing device are separated from each other by the buffering element. Moreover, since the external force is received by the buffering element, the sensing device can be protected by the buffering element. Moreover, once the buffering elastic force of the buffering element is released, the contact element is returned to the original position. Consequently, the failure probability of the touch pen is reduced. Since the buffering element has a transmission pin and connected with the circuit board of the sensing device, after the touch signal is generated by the controlling unit, the touch signal may be transmitted to the capacitive touch pad through the circuit board, the transmission pin and the contact element. That is, in addition to the function of separating the contact element from the sensing device, the buffering element further has the function of transmitting the touch signal. Moreover, since the touch pen of the present invention further comprises the calibration element for continuously pushing the sensing device, the sensing element may be considered as a linear element. Consequently, the magnitude of the pressing force for operating the touch pen can be easily controlled by the user.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
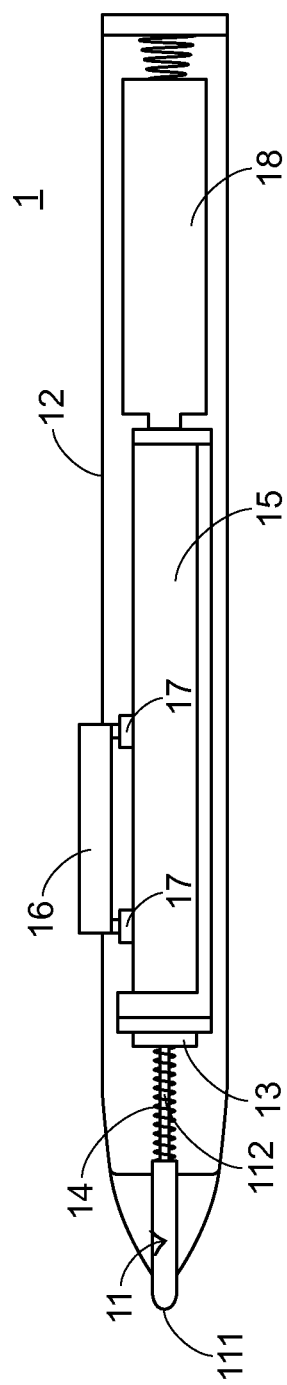
FIG. 1 is a schematic cross-sectional view of a conventional capacitive touch pen.
Figure 2:
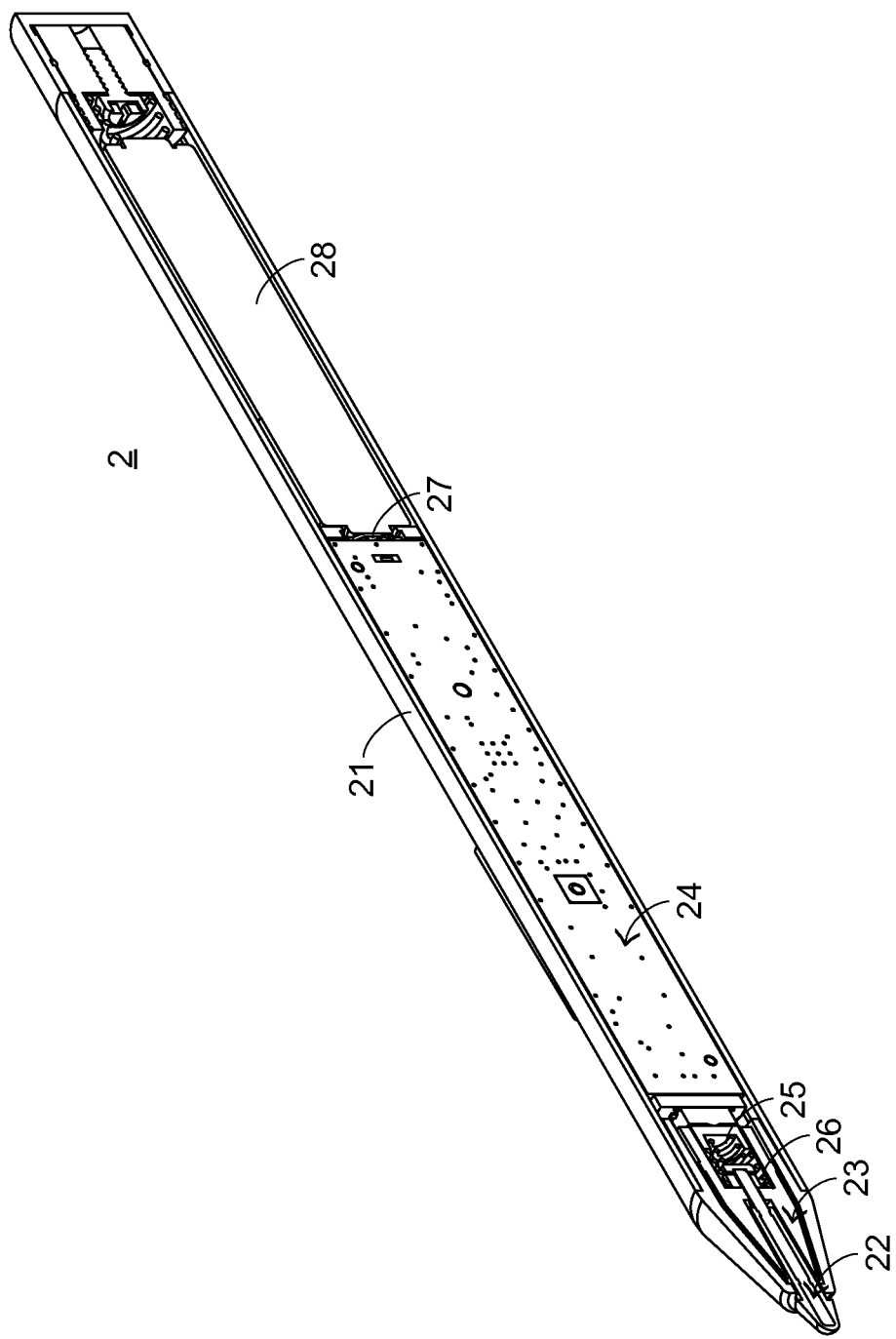
FIG. 2 is a schematic cross-sectional view illustrating a touch pen according to an embodiment of the present invention.
Figure 3:
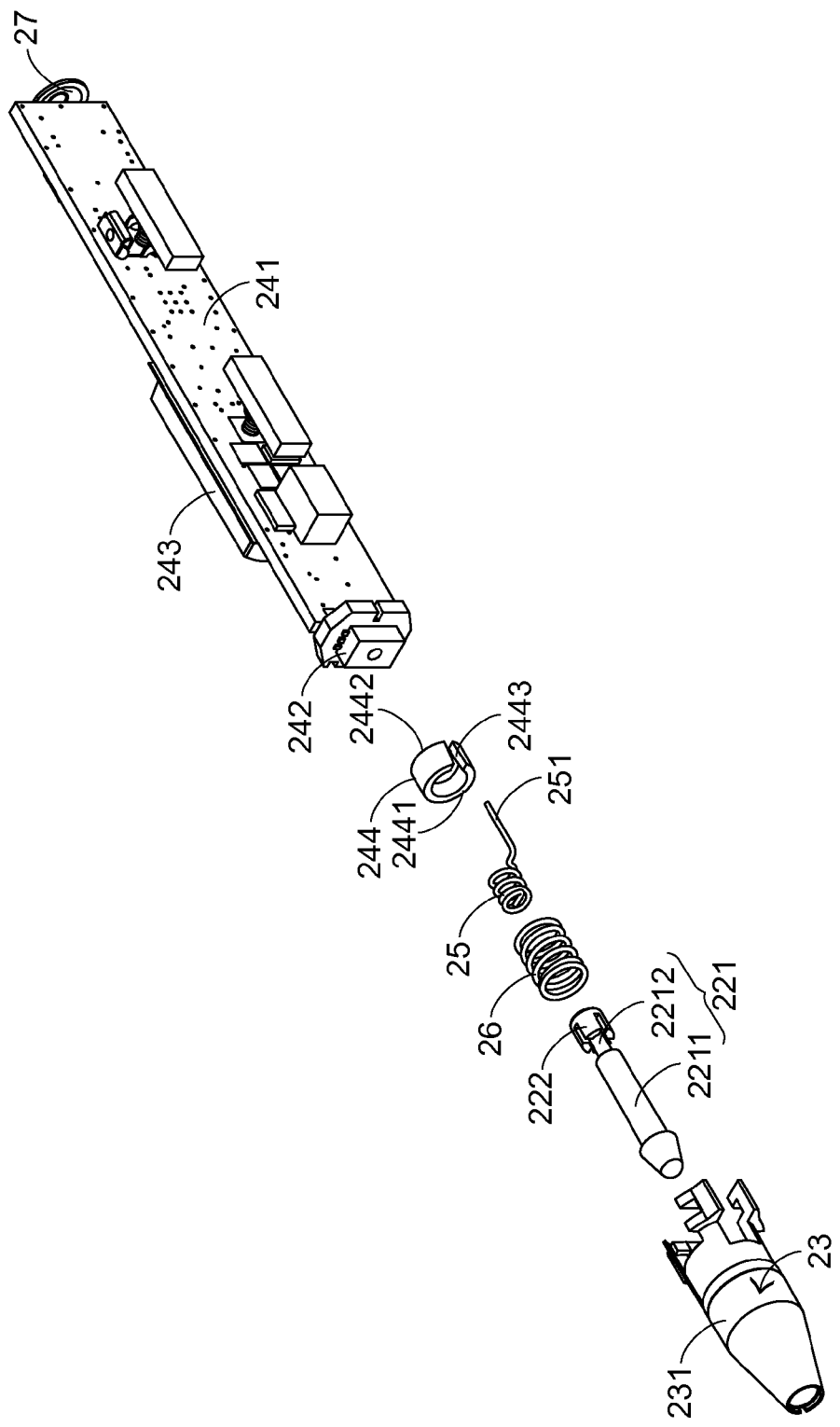
FIG. 3 is a schematic exploded view illustrating a portion of the touch pen according to the embodiment of the present invention.

For solving the drawbacks of the conventional technology, the present invention provides a touch pen. Hereinafter, the structure of a touch pen will be illustrated with reference to FIGS. 2 and 3. FIG. 2 is a schematic cross-sectional view illustrating a touch pen according to an embodiment of the present invention. FIG. 3 is a schematic exploded view illustrating a portion of the touch pen according to the embodiment of the present invention. The touch pen 2 is used for controlling a capacitive touch pad (not shown). In this embodiment, the touch pen 2 comprises a main body 21, a contact element 22, a sleeve 23, a sensing device 24, a buffering element 25, a calibration element 26, a conductive part 27 and a battery 28. The contact element 22 is disposed on the main body 21 and partially protruded out of the main body 21. When the contact element 22 is contacted with the capacitive touch pad, the sensing device 24 is triggered to generate a touch signal and the touch signal is transmitted to the capacitive touch pad. The sleeve 23 is disposed within the main body 21. Moreover, the contact element 22 is penetrated through the sleeve 23 and movably fixed on the sleeve 23. The sensing device 24 is disposed within the sleeve 23. In response to the movement of the contact element 22, the sensing device 24 is triggered to generate the touch signal. In this embodiment, the touch pen 2 is an active capacitive touch pen, and the contact element 22 is made of an electrically conductive material.

The buffering element 25 is disposed within the sleeve 23 and contacted with the contact element 22 and the sensing device 24. The buffering element 25 has two functions. Firstly, the contact element 22 and the sensing device 24 are separated from each other by the buffering element 25, so that the contact element 22 is not in direct contact with the sensing device 24. Secondly, the touch signal may be transmitted to the contact element 22 through the buffering element 25. Moreover, the buffering element 25 has a transmission pin 251. The calibration element 26 is disposed within the sleeve 23 and arranged around the buffering element 25. Moreover, the calibration element 26 may be contacted with the sensing device 24. The calibration element 26 is used for providing a calibrated elastic force to the sensing device 24 in order to facilitate the smooth operation of the sensing device 24. The function of the calibration element 26 will be illustrated in more details later. The conductive part 27 is disposed within the main body 21 and connected with the sensing device 24. The battery 28 is installed within the main body 21 and contacted with the conductive part 27. Consequently, the battery 28 may be electrically connected with the sensing device 24 to provide electric power to the sensing device 24. In this embodiment, both of the buffering element 25 and the calibration element 26 are spiral springs.

Figure 4:
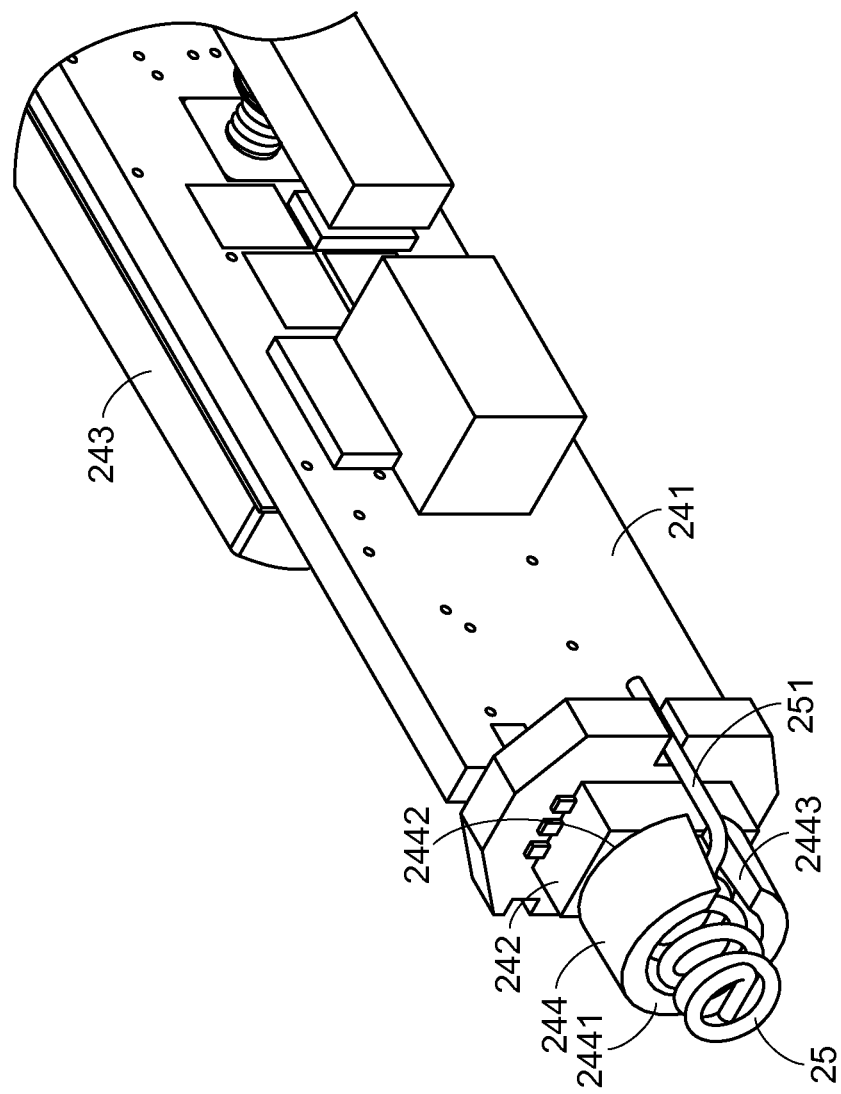
FIG. 4 is a schematic assembled view illustrating a portion of the touch pen according to the embodiment of the present invention.
Figure 5:
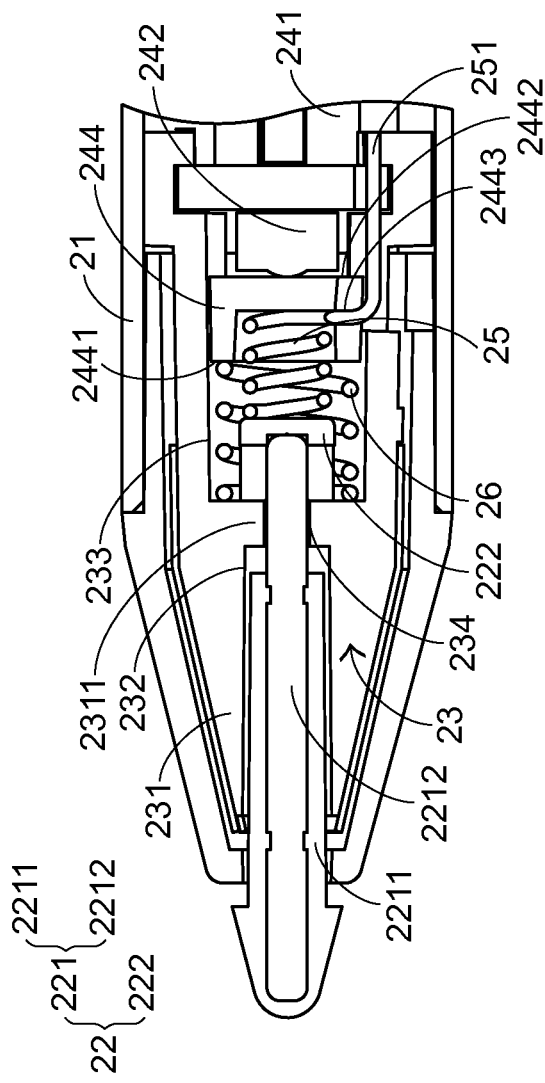
FIG. 5 is a schematic cross-sectional view illustrating a portion of the touch pen according to the embodiment of the present invention.

The components of the touch pen 2 will be illustrated in more details as follows. FIG. 4 is a schematic assembled view illustrating a portion of the touch pen according to the embodiment of the present invention. FIG. 5 is a schematic cross-sectional view illustrating a portion of the touch pen according to the embodiment of the present invention. Please refer to FIGS. 2~5. The sleeve 23 comprises a sleeve body 231, a first recess 232, a second recess 233 and an opening 234. The sleeve body 231 comprises a spacer 2311. The spacer 2311 is formed in a first side of the first recess 232. The second recess 233 is formed in a second side of the spacer 2311. The opening 234 is formed in the spacer 2311. Moreover, the opening 234 is in communication with the first recess 232 and the second recess 233. The contact element 22 is penetrated through the opening 234 of the sleeve 23 and movably fixed on the sleeve 23. In this embodiment, the contact element 22 comprises a contact pin tip 221 and a pen tip cap 222. The contact pin tip 221 comprises a first segment 2211 and a second segment 2212. The second segment 2212 is inserted into the first segment 2211, wherein the diameter of the second segment 2212 is smaller than the diameter of the first segment 2211. The first segment 2211 is accommodated within the first recess 232. In case that the touch pen 2 is not used, the first segment 2211 is not contacted with the spacer 2311. The second segment 2212 is penetrated through the opening 234 and partially accommodated within the second recess 233. The pen tip cap 222 is disposed on the second segment 2212 and contacted with the buffering element 25. In this embodiment, the second segment 2212 is inserted into the first segment 2211, so that the first segment 2211 and the second segment 2212 are combined together. It is noted that the way of combining the first segment 2211 and the second segment 2212 is not restricted. Alternatively, in another embodiment, the first segment and the second segment are integrally formed with each other.

Please refer to FIGS. 3, 4 and 5. The sensing device 24 comprises a circuit board 241, a sensing element 242, a controlling unit 243 and a covering element 244. The circuit board 241 is disposed within the main body 21 and partially inserted into the second recess 233 of the sleeve 23. The sensing element 242 is disposed on the circuit board 241. When the sensing element 242 is triggered, a pressure sensing signal is generated. The controlling unit 243 is disposed on the circuit board 241 and connected with the sensing element 242. After the pressure sensing signal is received by the controlling unit 243, the controlling unit 243 may judge whether the touch signal is generated according to the pressure sensing signal. A first end 2441 of the covering element 244 is contacted with the calibration element 26. A second end 2442 of the covering element 244 is contacted with the sensing element 242. The covering element 244 has two functions. Firstly, the covering element 244 may cover the buffering element 25. Secondly, in response to the calibrated elastic force provided by the calibration element 26, the sensing element 242 is continuously pushed by the covering element 244. The covering element 244 has a slot 2443. The slot 2443 is formed in a lateral wall of the covering element 244. As shown in FIG. 4, the transmission pin 251 of the buffering element 25 is penetrated through the slot 2443 and connected with the circuit board 241. In this embodiment, the sensing element 242 is a force-sensitive resistor (FSR) sensor, and the controlling unit 243 is a microprocessor.

In accordance with a feature of the present invention, the structure of the calibration element 26 of the touch pen 2 is designed to continuously push the sensing element 242 because of the following reasons. Although the sensing element 242 may generate different pressure sensing signals according to different intensities of the pressing force, the intensities of the pressing force received by the sensing element 242 and the intensities of the pressure sensing signals are not in a linear relationship. As previously described in the prior art, if the same result is obtained in response to different intensities of the pressing force, the use of the touch pen may perplex the user. The inventors found that once the intensity of the pressing force applied to the sensing element 242 is larger than a specified value, the intensity of pressure sensing signal generated by the sensing element 242 is correspondingly varied with the intensity of the pressing force. In particular, the intensity of the pressing force larger than the specified value is in direct proportion to the intensity of pressure sensing signal. According to the design of the present invention, the intensity of the pressing force larger than the specified value is continuously applied to the sensing element 242. Consequently, the sensing element 242 may be considered as a linear element. Due to the linear relationship between the intensities of the pressing force and the intensities of the pressure sensing signals, different results are obtained in response to different intensities of the pressing force. Under this circumstance, the user-friendliness of the touch pen is enhanced.

Figure 6:
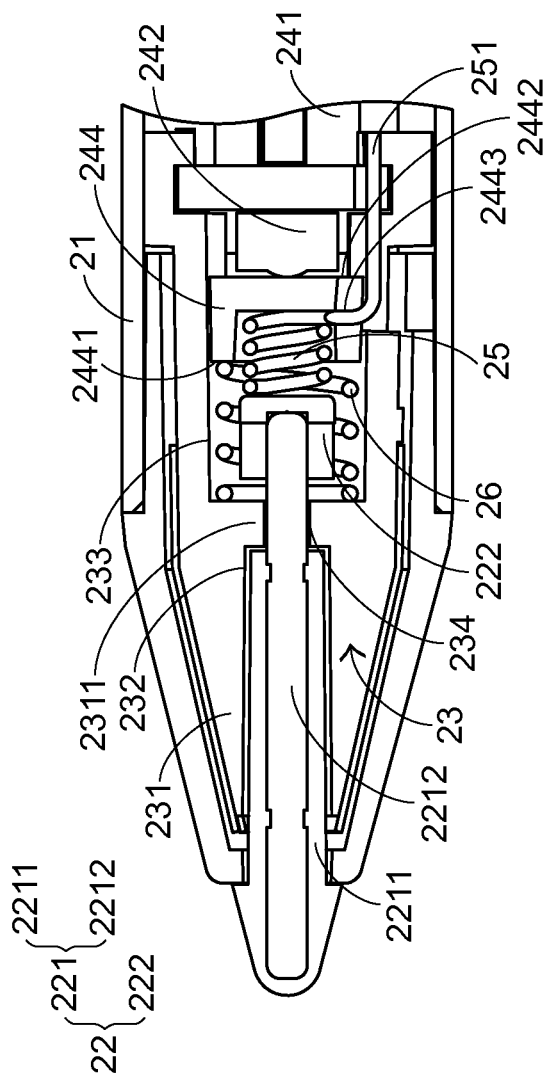
FIG. 6 is a schematic cross-sectional view illustrating a portion of the touch pen according to the embodiment of the present invention, in which the touch pen is pushed.

Hereinafter, the operations of the touch pen of the present invention will be illustrated with reference to FIGS. 2~6. FIG. 6 is a schematic cross-sectional view illustrating a portion of the touch pen according to the embodiment of the present invention, in which the touch pen is pushed.

When an actuating button (not shown) of the touch pen 2 is pressed by the user, the touch pen 2 is activated. The structure and the operating principle of the actuating button are similar to those of the conventional touch pen, and are not redundantly described herein. After the touch pen 2 is activated, the user may grasp the touch pen 2 and allow the first segment 2211 of the contact pin tip 221 to be contacted with the capacitive touch pad. Consequently, the contact pin tip 221 is moved relative to the main body 21 in the direction toward the sensing element 242, and the second segment 2212 of the contact pin tip 221 and the pen tip cap 222 are moved with the contact pin tip 221. Under this circumstance, the buffering element 25 is pushed and compressed by the second segment 2212 of the contact pin tip 221 and the pen tip cap 222, so that the buffering element 25 accumulates an elastic force. During the process of moving the contact pin tip 221 to the sensing element 242, the first segment 2211 of the contact pin tip 221 is moved to a position contacting the spacer 2311. Under this circumstance, the first segment 2211 of the contact pin tip 221 is stopped by the spacer 2311, and the movable distance of the contact pin tip 221 is limited by the spacer 2311. Consequently, the second segment 2212 of the contact pin tip 221 may be only contacted with the buffering element 25 and cannot be contacted with the sensing device 24.

At the same time, the compressed buffering element 25 pushes the covering element 244. Consequently, the covering element 244 which is continuously pushed by the calibration element 26 may further push the sensing element 242. Under this circumstance, the sensing element 242 generates a pressure sensing signal corresponding to the pressing force, and the pressure sensing signal is transmitted from the circuit board 241 to the controlling unit 243. The controlling unit 243 judges whether the intensity of the pressure sensing signal is larger than or equal to a predetermined pressure value. The predetermined pressure value is previously stored in the controlling unit 243. If the controlling unit 243 judges that the intensity of the pressure sensing signal is larger than or equal to the predetermined pressure value, the controlling unit 243 generates a corresponding touch signal. Whereas, if the controlling unit 243 judges that the intensity of the pressure sensing signal is smaller than the predetermined pressure value, the controlling unit 243 does not generate the touch signal. Then, the touch signal generated by the controlling unit 243 is transmitted to the transmission pin 251 of the buffering element 25 through the circuit board 241 and then transmitted to the buffering element 25 and the contact element 22, which is contacted with the buffering element 25. Consequently, the touch signal is transmitted to the capacitive touch pad through the contact element 22. Under this circumstance, the capacitance value of the touch point between the capacitive touch pad and the conductive pen tip 2 is changed. According to the change of the capacitance value, the capacitive touch pad may recognize the position of the touch point and generate a corresponding command.

When the touch pen 2 is not used and the touch pen 2 is moved away the capacitive touch pad, the contact element 22 is no longer contacted with the capacitive touch pad. Under this circumstance, the compressed buffering element 25 releases the buffering elastic force so as to push the contact element 22. Consequently, the contact element 22 is moved relative to the main body 21 in the direction away from the sensing device 24, and the contact element 22 is returned to the original position before being pushed (see FIG. 5).

It is noted that the settings of the controlling unit of the present invention may be varied according to practical requirements. For example, in another embodiment, N which are predetermined pressure values may be previously stored in the controlling unit. Consequently, (N+1) kinds of touch signals may be generated by the controlling unit. For example, a first predetermined pressure value and a second predetermined pressure value may be previously stored in the controlling unit, wherein the second predetermined pressure value is smaller than the first predetermined pressure value. If the controlling unit judges that the pressing force received by the sensing element is larger than the first predetermined pressure value, the controlling unit generates a first touch signal. According to the first touch signal, the trajectory of the touch pen dragged on the capacitive touch pad may result in a thicker line. If the controlling unit judges that the pressing force received by the sensing element is in the range between the first predetermined pressure value and the second predetermined pressure value, the controlling unit generates a second touch signal. According to the second touch signal, the trajectory of the touch pen dragged on the capacitive touch pad may result in a line with a medium thickness. If the controlling unit judges that the pressing force received by the sensing element is smaller than the second predetermined pressure value, the controlling unit generates a third touch signal. According to the third touch signal, the trajectory of the touch pen dragged on the capacitive touch pad may result in a thinner line.

From the above descriptions, the present invention provides the touch pen. The buffering element is arranged between the contact element and the sensing device. The contact element and the sensing device are separated from each other by the buffering element. If the external force applied to the touch pen is very large and the contact element is moved relative to the sleeve in the direction toward the sensing device, the impact of the contact element on the sensing device is largely reduced because the contact element and the sensing device are separated from each other by the buffering element. Moreover, since the external force is received by the buffering element, the sensing device can be protected by the buffering element. Moreover, once the buffering elastic force of the buffering element is released, the contact element is returned to the original position. Consequently, the failure probability of the touch pen is reduced. Since the buffering element has the transmission pin and connected with the circuit board of the sensing device, after the touch signal is generated by the controlling unit, the touch signal may be transmitted to the capacitive touch pad through the circuit board, the transmission pin and the contact element. That is, in addition to the function of separating the contact element from the sensing device, the buffering element further has the function of transmitting the touch signal. Moreover, since the touch pen of the present invention further comprises the calibration element for continuously pushing the sensing device, the sensing element may be considered as a linear element. Consequently, the magnitude of the pressing force for operating the touch pen can be easily controlled by the user.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch pen for a capacitive touch pad, the touch pen comprising:
    a main body;
    a contact element disposed on the main body and partially protruded out of the main body, wherein when the contact element is contacted with the capacitive touch pad, a touch signal is transmitted to the capacitive touch pad through the contact element;
    a sleeve disposed within the main body, wherein the contact element is penetrated through the sleeve and movably fixed on the sleeve;
    a sensing device disposed within the sleeve, wherein in response to a movement of the contact element, the sensing device is triggered to generate the touch signal, wherein the sensing device comprises:
        a circuit board disposed within the main body and partially inserted into the sleeve;
        a sensing element disposed on the circuit board and generating a pressure sensing signal;
        a controlling unit disposed on the circuit board and connected with the sensing element, wherein according to the pressure sensing signal, the controlling unit judges whether the touch signal is generated; and
        a covering element;
    a buffering element disposed within the sleeve and contacted with the contact element and the sensing device, wherein the contact element and the sensing device are separated from each other by the buffering element, and the touch signal is transmitted to the contact element through the buffering element; and a calibration element, wherein the calibration element is disposed within the sleeve, arranged around the buffering element contracted with the sensing device, wherein the calibration element provides a calibrated elastic force to sensing device, wherein a first end of the covering element is contracted with the calibration element, a second end of the covering element is contracted with the sensing element, and the buffering element is covered by the covering element, wherein in response to the calibrated elastic force provided by the calibration element, the sensing element is continuously pushed by the covering element, wherein where the contract element is contracted with the capacitive touch pad, the contract element is moved relative to the sleeve to push the buffering element, so that the buffering elements pushes the covering element to trigger the sensing element and the sensing element generates a corresponding pressure sensing signal to the controlling unit.

2. The touch pen according to claim 1, wherein the sleeve comprises:
    a sleeve body comprising a spacer;
    a first recess formed in a first side of the spacer;
    a second recess formed in a second side of the spacer; and
    an opening formed in the spacer and in communication with the first recess and the second recess, wherein the contact element is penetrated through the opening and movably fixed on the sleeve.

3. The touch pen according to claim 2, wherein the contact element comprises:

a contact pin tip comprising a first segment and a second segment, wherein the first segment is accommodated within the first recess, and the first segment is not contacted with the spacer, wherein the second segment is penetrated through the opening of the sleeve and accommodated within the second recess; and
    a pen tip cap disposed on the second segment of the contact pin tip and contacted with the buffering element,
    wherein when the contact element is moved in response to an external force, the first segment of the contact pin tip is stopped by the spacer.

4. The touch pen according to claim 1, wherein both of the buffering element and the calibration element are spiral springs.

5. The touch pen according to claim 1, wherein if the controlling unit receives the pressure sensing signal and judges that an intensity of the pressure sensing signal is larger than or equal to a predetermined pressure value, the controlling unit generates the touch signal, wherein if the controlling unit receives the pressure sensing signal and judges that the intensity of the pressure sensing signal is smaller than the predetermined pressure value, the controlling unit does not generate the touch signal.

6. The touch pen according to claim 1, wherein the covering element has a slot, and the buffering element has a transmission pin, wherein the transmission pin is penetrated through the slot and connected with the circuit board.

7. The touch pen according to claim 6, wherein the touch signal generated by the controlling unit is transmitted to the capacitive touch pad through the circuit board, the transmission pin and the contact element.

* * * * *